US011620363B1

(12) United States Patent
Woodward et al.

(10) Patent No.: US 11,620,363 B1
(45) Date of Patent: Apr. 4, 2023

(54) SYSTEMS AND METHODS FOR AUTHENTICATION AND AUTHORIZATION FOR SOFTWARE LICENSE MANAGEMENT

(71) Applicant: SHAYRE, INC., Los Angeles, CA (US)

(72) Inventors: Christopher John Woodward, Hermosa Beach, CA (US); Christopher Joseph Monte, Los Angeles, CA (US); Matthew Lyle Comeione, Burbank, CA (US)

(73) Assignee: SHAYRE, INC., Los Angeles, CA (US)

( * ) Notice: Subject to any disclaimer, the term of this patent is extended or adjusted under 35 U.S.C. 154(b) by 0 days.

(21) Appl. No.: 17/202,030

(22) Filed: Mar. 15, 2021

(51) Int. Cl.
*G06F 21/10* (2013.01)
*H04L 9/30* (2006.01)
*G06F 21/31* (2013.01)

(52) U.S. Cl.
CPC ............ *G06F 21/105* (2013.01); *G06F 21/31* (2013.01); *H04L 9/30* (2013.01)

(58) Field of Classification Search
CPC ........ G06F 21/12; G06F 21/31; G06F 21/105; H04L 9/30
See application file for complete search history.

(56) References Cited

U.S. PATENT DOCUMENTS

| | | | |
|---|---|---|---|
| 7,613,770 B2 | 11/2009 | Li | |
| 7,703,142 B1 * | 4/2010 | Wilson | H04W 12/084 713/168 |
| 8,122,488 B2 | 2/2012 | Hoch | |
| 8,745,718 B1 | 6/2014 | Dufel | |
| 9,104,844 B2 * | 8/2015 | Fang | G06F 21/105 |
| 9,122,848 B2 | 9/2015 | Jurkiewicz | |
| 9,473,304 B1 | 10/2016 | Dixon | |
| 9,781,122 B1 | 10/2017 | Wilson | |
| 9,858,781 B1 | 1/2018 | Campero | |
| 10,218,690 B2 | 2/2019 | Helsen | |
| 10,455,011 B2 | 10/2019 | Kendall | |
| 10,467,385 B2 | 11/2019 | Ciszewski | |
| 10,601,829 B1 | 3/2020 | Nelson | |
| 10,673,628 B1 | 6/2020 | Shtop | |
| 10,719,503 B1 | 7/2020 | Bar Oz | |
| 11,025,626 B1 | 6/2021 | Todd | |
| 11,218,314 B2 | 1/2022 | Tan | |
| 11,233,802 B1 | 1/2022 | Rudeanu | |

(Continued)

*Primary Examiner* — Dao Q Ho
(74) *Attorney, Agent, or Firm* — Esplin & Associates, PC (57) ABSTRACT

Systems and methods for providing authentication and authorization for software license management of a particular software-controlled application are disclosed. Exemplary implementations may: store information electronically, including different types of user information, hardware information, key information, and license information; receive a user request for user-specific authentication and device-specific authorization to access and/or use the particular software-controlled application; perform different types of (automated) verification based on the user identifier, the hardware identifier, and the machine identifier in the user request; and, responsive to particular results from the different types of verification, perform some combination of transferring a response to the user request and performing registration and/or assignment as requested.

18 Claims, 7 Drawing Sheets

(56) References Cited

U.S. PATENT DOCUMENTS

| | | | |
|---|---|---|---|
| 11,522,864 B1 | 12/2022 | Gohil | |
| 11,544,356 B2 | 1/2023 | Huang | |
| 2005/0078825 A1* | 4/2005 | Ohmori | H04N 21/835 380/255 |
| 2009/0113543 A1* | 4/2009 | Adams | H04L 9/3271 726/20 |
| 2013/0191884 A1 | 7/2013 | Leicher | |
| 2014/0123124 A1* | 5/2014 | Gray | G06F 8/654 717/170 |
| 2014/0189840 A1 | 7/2014 | Metke | |
| 2016/0087955 A1 | 3/2016 | Mohamad Abdul | |
| 2016/0094531 A1 | 3/2016 | Unnikrishnan | |
| 2016/0127352 A1 | 5/2016 | Hong | |
| 2016/0134599 A1 | 5/2016 | Ross | |
| 2016/0337369 A1 | 11/2016 | Sanso | |
| 2017/0034172 A1 | 2/2017 | Biggs | |
| 2017/0118280 A1 | 4/2017 | Miyoshi | |
| 2017/0149755 A1 | 5/2017 | Soneda | |
| 2017/0244695 A1 | 8/2017 | Lund | |
| 2017/0250971 A1 | 8/2017 | Gillespie | |
| 2017/0357784 A1 | 12/2017 | Duda | |
| 2018/0034858 A1 | 2/2018 | Gummaraju | |
| 2018/0041491 A1 | 2/2018 | Gupta | |
| 2018/0083915 A1 | 3/2018 | Medam | |
| 2018/0083941 A1 | 3/2018 | Thakkar | |
| 2018/0083944 A1 | 3/2018 | Vats | |
| 2018/0167214 A1 | 6/2018 | Volchok | |
| 2018/0219846 A1 | 8/2018 | Poschel | |
| 2018/0219863 A1 | 8/2018 | Tran | |
| 2018/0278603 A1 | 9/2018 | Yabe | |
| 2018/0302406 A1 | 10/2018 | Burckhardt | |
| 2018/0316685 A1 | 11/2018 | Eberlein | |
| 2018/0367526 A1 | 12/2018 | Huang | |
| 2018/0367528 A1 | 12/2018 | Schwarz | |
| 2019/0028414 A1 | 1/2019 | Walker | |
| 2019/0108097 A1 | 4/2019 | Zhuang | |
| 2019/0149576 A1 | 5/2019 | Rajavelsamy | |
| 2019/0190912 A1 | 6/2019 | De Boer | |
| 2019/0205559 A1 | 7/2019 | Gupta | |
| 2019/0278929 A1 | 9/2019 | Kakumani | |
| 2019/0303600 A1 | 10/2019 | Hamel | |
| 2019/0306138 A1 | 10/2019 | Carru | |
| 2019/0312857 A1 | 10/2019 | Lander | |
| 2019/0312887 A1 | 10/2019 | Grimm | |
| 2019/0327223 A1 | 10/2019 | Kumar | |
| 2019/0334884 A1 | 10/2019 | Ross | |
| 2019/0349426 A1 | 11/2019 | Smith | |
| 2019/0356478 A1 | 11/2019 | Young | |
| 2019/0356529 A1 | 11/2019 | Gulati | |
| 2019/0372960 A1 | 12/2019 | Huang | |
| 2019/0394041 A1 | 12/2019 | Jain | |
| 2020/0053091 A1 | 2/2020 | Childress | |
| 2020/0059360 A1 | 2/2020 | Martynov | |
| 2020/0125713 A1 | 4/2020 | Davis | |
| 2020/0150980 A1* | 5/2020 | Huang | H04L 63/0815 |
| 2020/0220853 A1 | 7/2020 | Xu | |
| 2020/0257700 A1 | 8/2020 | Xu | |
| 2020/0314211 A1 | 10/2020 | Oye | |
| 2020/0409934 A1 | 12/2020 | Bar Oz | |
| 2021/0021609 A1 | 1/2021 | Smith | |
| 2021/0044634 A1 | 2/2021 | Hughes | |
| 2021/0105254 A1 | 4/2021 | Walters | |
| 2021/0218726 A1 | 7/2021 | Sundararajan | |
| 2021/0218742 A1 | 7/2021 | Cook | |
| 2021/0266306 A1 | 8/2021 | Furman | |
| 2021/0273931 A1 | 9/2021 | Murdoch | |
| 2021/0286861 A1* | 9/2021 | Churchill | G06F 21/31 |
| 2021/0409403 A1 | 12/2021 | Lewin | |
| 2022/0116393 A1 | 4/2022 | K | |
| 2022/0210141 A1 | 6/2022 | Parekh | |
| 2022/0247787 A1 | 8/2022 | Lippert | |
| 2022/0294788 A1 | 9/2022 | Pattar | |

* cited by examiner

SYSTEMS AND METHODS FOR AUTHENTICATION AND AUTHORIZATION FOR SOFTWARE LICENSE MANAGEMENT

FIELD OF THE DISCLOSURE

The present disclosure relates to systems and methods for providing authentication and authorization for software license management of one or more software-controlled applications.

BACKGROUND

Using password protection for authorization of access to software applications is known. Using licenses to manage access to software applications is known. Managing (software application) licenses for groups of users often involves manual and/or time-consuming steps, typically performed by an administrator.

SUMMARY

One aspect of the present disclosure relates to a system configured for providing authentication and authorization for software license management of a particular software-controlled application. As used herein, the term "software-controlled application" may refer to both (i) applications that are entirely software based, including but not limited to enterprise software, peer-to-peer software, and/or other types of software applications, and (ii) applications where a software component or a software layer is used to control a hardware application, including but not limited to code signing certificates, encrypted hard drives, security-enabled equipment, and/or other hardware applications that may be controlled by software. The system may include electronic storage, one or more hardware processors, and/or other components. The electronic storage may be configured to store information electronically, including different types of user information, hardware information, key information, and license information. The one or more hardware processors may be configured to receive a user request for user-specific authentication and device-specific authorization to access and/or use the particular software-controlled application. The one or more hardware processors may be configured to perform different types of (automated) verification based on the user identifier, the hardware identifier, and the machine identifier in the user request. The one or more hardware processors may be configured to perform, responsive to particular results from the different types of verification, some combination of transferring a response to the user request that may include a standard HTTP status code and performing registration and/or assignment as requested.

Another aspect of the present disclosure relates to a method for providing authentication and authorization for software license management of a particular software-controlled application. The method may include storing information electronically, including different types of user information, hardware information, key information, and license information. The method may include receiving a user request for user-specific authentication and device-specific authorization to access and/or use the particular software-controlled application. The method may include performing different types of (automated) verification based on the user identifier, the hardware identifier, and the machine identifier in the user request. The method may include performing, responsive to particular results from the different types of verification, some combination of transferring a response to the user request that may include a standard HTTP status code and performing registration and/or assignment as requested.

As used herein, any association (or relation, or reflection, or indication, or correspondency) involving servers, processors, client computing platforms, devices, different types of information, different types of verification, presentations, user interfaces, user interface elements, determinations, responses, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
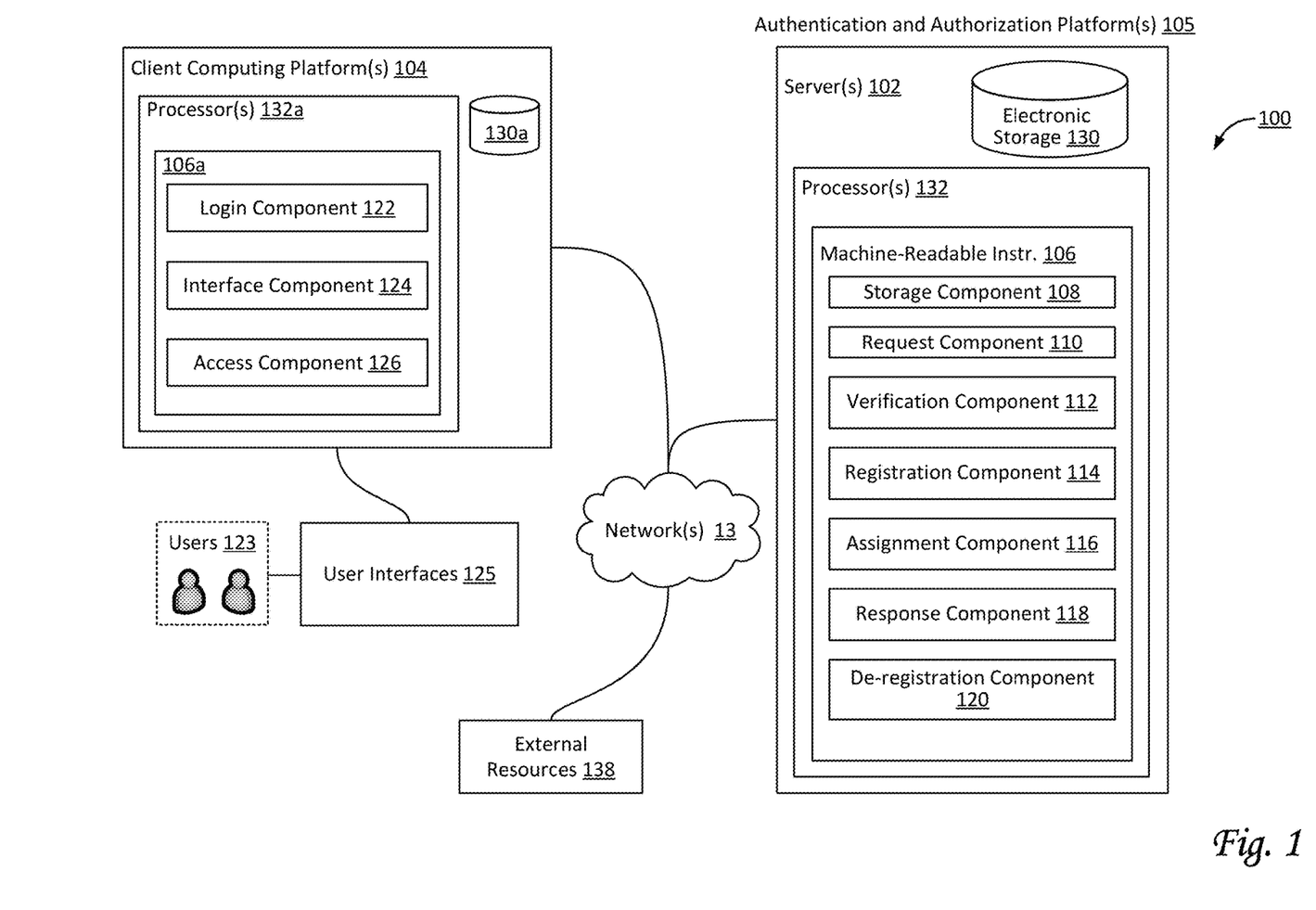
FIG. 1 illustrates a system configured for providing authentication and authorization for software license management of a particular software-controlled application, in accordance with one or more implementations.

FIG. 1 illustrates a system 100 configured for providing authentication and authorization for software license management of one or more software-controlled applications, in accordance with one or more implementations. In some implementations, system 100 may include one or more authentication and authorization platforms 105, one or more client computing platforms 104, one or more servers 102, electronic storage 130, one or more processors 132, one or more user interfaces 125, external resources 138, and/or other components. Authentication and authorization platforms 105 and server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. In some implementations, individual ones of users 123 may be associated with individual client computing platforms 104. For example, a first user may be associated with a first client computing platform 104, a second user may be associated with a second client computing platform 104, and so forth. In some implementations, individual user interfaces 125 may be associated with individual client computing platforms 104. For example, a first user interface 125 may be associated with a first client computing platform 104, a second user interface 125 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of storage component 108, request component 110, verification component 112, registration component 114, assignment component 116, response component 118, de-registration component 120, login component 122, interface component 124, access component 126, and/or other instruction components. Electronic storage 130a may be similar to electronic storage 130, though included in client computing platforms 104. Processors 132a may be similar to processors 132, though included in client computing platforms 104. Machine-readable instructions 106a may be similar to machine-readable instructions 106, though included in client computing platforms 104.

Storage component 108 may be configured to store information electronically, e.g., in electronic storage 130. In some implementations, stored information may be indexed, organized, structured, and/or otherwise searchable. For example, the stored information may include tables, databases, relational databases, and/or other types of structural data storage. In some implementations, the stored information may include user information that identifies a set of authorized users that are authorized to access and/or use one or more software-controlled applications. In some implementations, the stored information may include registered hardware information that identifies a set of registered client computing platforms that have been registered to access and/or use one or more software-controlled applications. In some implementations, the stored information may include registered key information that identifies a set of registered cryptographic keys that have been registered to access and/or use one or more software-controlled applications. In some implementations, the stored information may include revoked key information that identifies a set of revoked cryptographic keys that are no longer registered to access and/or use one or more software-controlled applications. For example, in some implementations, individual ones of the set of revoked cryptographic keys may correspond to pre-viously-registered client computing platforms that have been reported stolen or missing. In some implementations, the stored information may include assigned license information that identifies a set of assigned licenses that have been assigned to specific users and specific client computing platforms. Individual ones of the set of licenses may be associated with individual expiration dates. In some implementations, the stored information may include revoked license information that identifies a set of revoked licenses that are no longer assigned for access and/or use of one or more software-controlled applications. In some implementations, the stored information may include available license information that identifies a set of available licenses that are available to be assigned to a specific user and a specific client computing platform.

In some implementations, the stored information may include license information regarding license pools. For example, a particular pool or set or number of licenses may be designated for a particular group of users. As long as the particular pool is not exhausted and/or otherwise fully assigned to group members, another user from the group may automatically be authenticated and/or authorized by system 100 such that an available license is assigned to this user.

Request component 110 may be configured to receive user requests from users 123. In some implementations, a user request may request to access and/or use a particular software-controlled application. In some implementations, a user request may request user-specific authentication to access and/or use a particular software-controlled application. Alternatively, and/or simultaneously, in some implementations, a user request may request device-specific authorization to access and/or use a particular software-controlled application. In some implementations, individual user-requests may be both user-specific and device-specific. In some implementations, user request may include one or more of a user identifier that identifies a user, a hardware identifier that identifies a particular client computing platform 104, a machine identifier that identifies a particular cryptographic key, and/or other information. For example, in some implementations, a user request may include a password that is provided by the user. For example, in some implementations, a user request may include a device name that identifies a particular client computing platform 104 (e.g., that is currently being used by the user to provide the user request).

In some implementations, hardware identifiers may be added to and/or provided by individual client computing platforms 104 as part of the user request. For example, a hardware identifier may be a Media Access Control (MAC) address, which may be supplied and/or otherwise provided by an individual client device. In some implementations, hardware identifiers may be a machine name, or may include a machine name, or may be a combination of a MAC address and a machine name.

In some implementations, machine identifiers may identify a public key used for Public Key Infrastructure (PKI). For example, a particular machine identifier may be a textual representation of a public key and/or another (generated) certificate. In some implementations, a machine identifier may be created by hashing a certificate and/or cryptographic key.

Verification component 112 may be configured to perform different types of verifications. Verifications may be performed in response to (or subsequent to) receiving user requests. Verifications may be based on information included in user requests, including but not limited to user identifiers, hardware identifiers, machine identifiers, and/or other information. The different types of verifications may include one or more of user-identifier verifications, hardware-identifier verifications, machine-identifier verifications, machine-revocation verifications, license-assignment verifications, license-revocation verifications, license-expiration verifications, license-availability verifications, and/or other types of verifications. In some implementations, a subset of these different types of verifications may be used to verify automatically whether a particular license has been assigned to a particular user. Alternatively, and/or simultaneously, in some implementations, a subset of these different types of verifications may be used to automatically assign an available license (e.g., from a license pool) to a particular user. Alternatively, and/or simultaneously, in some implementations, a subset of these different types of verifications may be used to accommodate an existing user requesting access to a particular software-controlled application using a new device (e.g., if a license was previously assigned to the existing user for a different device). Alternatively, and/or simultaneously, in some implementations, a subset of these different types of verifications may be used to handle a stolen, missing, or defective device (e.g., to ensure a previously assigned license is revoked so the old device will not have access to a particular software-controlled application and/or will not continue to use a license that might otherwise be available).

In some implementations, user-identifier verifications may be performed by verification component 112 to verify whether a particular user identifier (e.g., the user identifier in a particular user request) corresponds to one of the user identifiers in the set of authorized users (e.g., as included in the stored information). In some implementations, one or more types of verifications may be performed by comparisons between different items of information. For example, a user-identifier verification may be performed by comparing the particular user identifier with each of the authorized users in the stored information.

In some implementations, hardware-identifier verifications may be performed by verification component 112 to verify whether a particular hardware identifier (e.g., the hardware identifier in a particular user request) corresponds to one of the hardware identifiers in the set of registered client computing platforms (e.g., as included in the stored information). In some implementations, verification may include comparisons of stored information.

In some implementations, machine-identifier verifications may be performed by verification component 112 to verify whether a particular machine identifier (e.g., the machine identifier in a particular user request) corresponds to one of the machine identifiers in the set of registered cryptographic keys (e.g., as included in the stored information).

In some implementations, machine-revocation verifications may be performed by verification component 112 to verify whether a particular machine identifier (e.g., the machine identifier in a particular user request) corresponds to one of the machine identifiers in the set of revoked cryptographic keys (e.g., as included in the stored information).

In some implementations, license-assignment verifications may be performed by verification component 112 to verify whether a particular license (e.g., the license associated with the hardware identifier and the machine identifier in a particular user request) corresponds to one of the licenses in the set of assigned licenses (e.g., as included in the stored information).

In some implementations, license-revocation verifications may be performed by verification component 112 to verify whether a particular license (e.g., the license associated with the hardware identifier and the machine identifier in a particular user request) corresponds to one of the licenses in the set of revoked licenses (e.g., as may be included in the stored information).

In some implementations, license-expiration verifications may be performed by verification component 112 to verify whether a particular license has expired. Expiration may be based on individual expiration dates that are associated with individual licenses. Expiration dates may be included in the stored information.

In some implementations, license-availability verifications may be performed by verification component 112 to verify whether the set of available licenses includes an individual available license (e.g., that is currently available, or that is available in view of certain context such as identifiers and/or other information). For example, in some implementations, a license may be available provided that it is unassigned, unrevoked, and available to be assigned to a particular user. In some implementations, availability may be determined in view of a license pool. For example, a particular group of users may use a license pool that includes a particular number of licenses such that there may only be an available license if less than the number of licenses in the pool is currently assigned to the group of users that use the license pool.

In some implementations, particular verifications may be performed in response to (or subsequent to) one or more other verifications. For example, the machine-revocation verification may be performed responsive to the hardware-identifier verification verifying that the hardware identifier in the user request corresponds to one of the set of registered client computing platforms. For example, the license-assignment verification may be performed responsive to the machine-revocation verification verifying that the machine identifier in the user request does not correspond to one of the set of revoked cryptographic keys. For example, the license-expiration verification may be performed responsive to the license-assignment verification verifying that the particular license does not correspond to one of the set of assigned licenses. For example, the license-availability verification may be performed responsive to the hardware-identifier verification verifying that the hardware identifier in the user request does not correspond to one of the set of registered client computing platforms, and further responsive to the machine-identifier verification verifying that the machine identifier in the user request does not correspond to one of the set of registered cryptographic keys.

Registration component 114 may be configured to register one or more of a specific user (or user identifier), a specific client computing platform (or hardware identifier), a specific cryptographic key (or machine identifier), and/or other information. In some implementations, registration may include adding particular information to a particular set, table, database, and/or other type of stored information. For example, registration of particular hardware information may include adding the particular hardware information to the set of registered hardware information (e.g., as may be included in the stored information). For example, registration of particular machine information may include adding the particular machine information to the set of registered key information (e.g., as may be included in the stored information). In some implementations, registrations by registration component 114 may be performed in response to (or subsequent to) one or more verifications by verification component 112, or other actions by system 100. For example, responsive to the machine-identifier verification failing to verify that the machine identifier in the user request corresponds to one of the set of registered cryptographic keys, registration component 114 may be configured to register the machine identifier.

Assignment component 116 may be configured to assign a specific license (e.g., an individual available license) to a specific user and a specific client computing platform. In some implementations, assignment of a license may be specific to a machine identifier. In some implementations, assignment may include adding particular information to a particular set, table, database, and/or other type of stored information. For example, assignment of a particular license may include adding the particular license (and/or information regarding the particular license) to the set of assigned licenses (e.g., as may be included in the stored information). In some implementations, assignments by assignment component 116 may be performed in response to (or subsequent to) one or more verifications by verification component 112, or other actions by system 100. For example, responsive to the license-availability verification verifying that the set of available licenses includes an individual available license, assignment component 116 may be configured to assign the individual available license to the user such that the set of assigned licenses includes the individual available license. In some implementations, assignment of a particular license includes associating the particular license with a particular hardware identifier and a particular machine identifier, such that the particular hardware identifier is associated with the particular machine identifier and vice versa.

Response component 118 may be configured to transfer responses to user requests. In some implementations, individual responses may include individual standard HyperText Transfer Protocol (HTTP) status codes. In particular, responses may conform to the HTTP application layer protocol. For example, an individual standard HTTP status code may be "200", "201", "401", "402", "403", "404", "410", and/or other standard HTTP status codes. For example, a "200" status code may indicate a user request has been accepted. For example, a "201" status code may indicate a user request has been accepted, and a new resource has been created in the process. For example, a "401" status code may indicate the user request has not been accepted due to some (client) error. For example, a "402" status code may indicate the user request has not been accepted due to some (client) error that requires a payment. For example, a "403" status code may indicate the user request has not been accepted due to some (client) error that represents the client has no access, or no longer has access. For example, a "410" status code may indicate the user request has not been accepted due to some (client) error that represents a removal or revocation of rights. In some implementations, individual responses may include or use so-called "raw sockets". In some implementations, individual responses may conform to Quick UDP Internet Connections (QUIC). Other protocols and formats are considered within the scope of this disclosure. In some implementations, responses by response component 118 may be performed in response to (or subsequent to) one or more verifications by verification component 112, registrations by registration component 114, assignments by assignment component 116, or other actions by system 100.

For example, in some implementations, responsive to the machine-revocation verification verifying that the machine identifier in the user request corresponds to one of the set of revoked cryptographic keys, response component 118 may be configured to transfer a particular response to the user request that indicates the user request cannot be fulfilled due to error. For example, responsive to the license-assignment verification verifying that the particular license corresponds to one of the set of assigned licenses, response component 118 may be configured to transfer a particular response to the user request that indicates the user request has been accepted. For example, responsive to the license-expiration verification verifying that the particular license has expired, response component 118 may be configured to transfer a particular response to the user request that indicates the user request cannot be fulfilled due to error. For example, responsive to the license-availability verification verifying that the set of available licenses includes the individual available license, response component 118 may be configured to transfer a particular response to the user request that indicates the user request has been accepted. For example, responsive to the machine-identifier verification verifying that the machine identifier in the user request corresponds to one of the set of registered cryptographic keys, response component 118 may be configured to transfer a particular response to the user request that indicates the user request has been accepted. For example, responsive to the license-expiration verification verifying that the particular license has not expired, response component 118 may be configured to transfer a particular response to the user request that indicates the user request cannot be fulfilled due to error.

Figure 6:
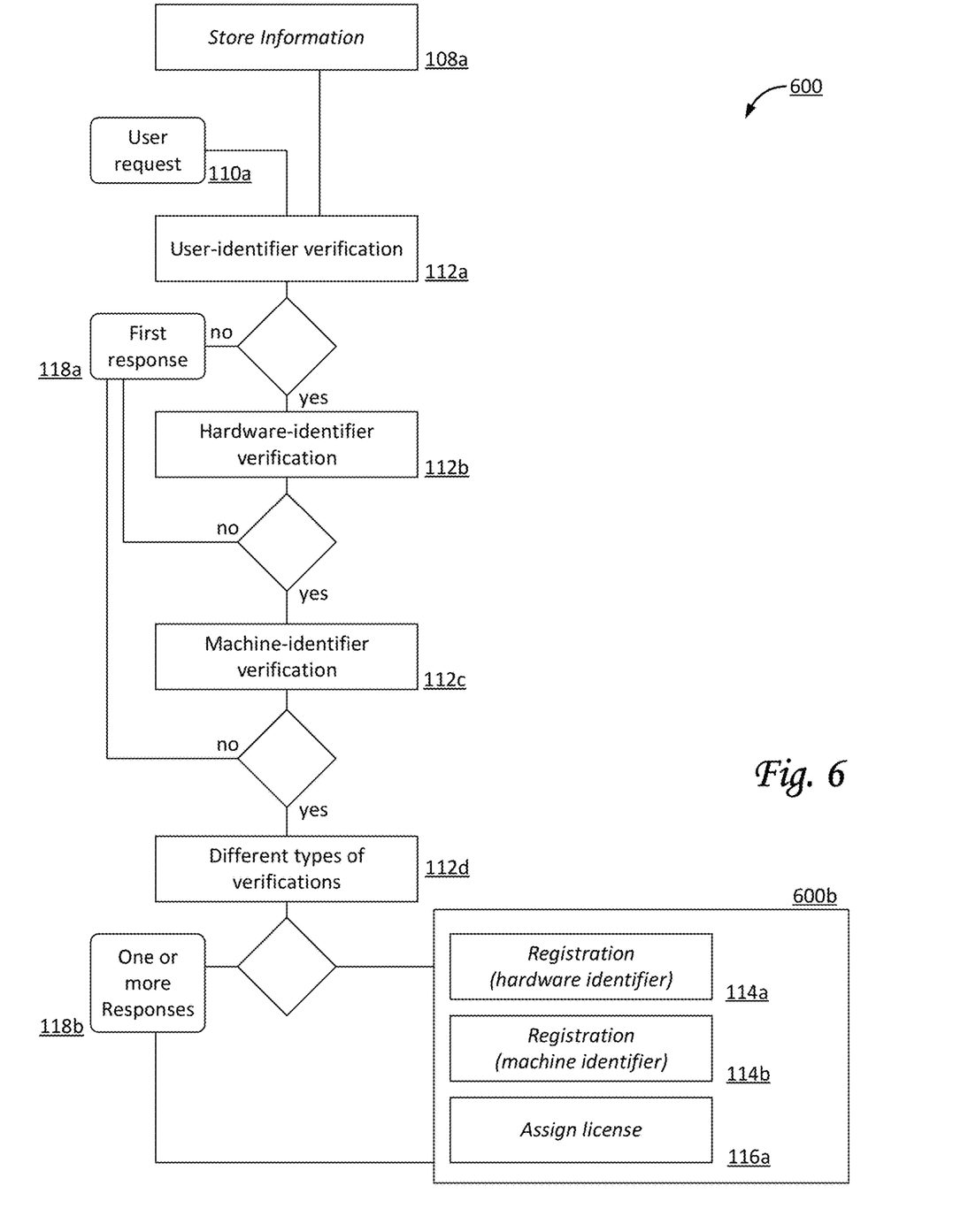

By way of non-limiting example, FIG. 6 illustrates an exemplary flow chart 600 as may be used in system 100 and/or by method 200. Flow chart 600 may start at step 108a, in which information is stored. Next, a user request is received, in step 110a. In step 112a, user-identifier verification may be performed. Based on the user-identifier verification, flow chart 600 either continues at response step 118a, or at step 112b, in which hardware-identifier verification may be performed. Based on the hardware-identifier verification, flow chart 600 either continues at response step 118a, or at step 112c, in which machine-identifier verification may be performed. Based on the machine-identifier verification, flow chart 600 either continues at response step 118a, or at step 112d, in which different (additional) types of verifications may be performed. Based on the results of these different (additional) types of verifications, flow chart 600 either continues at response step 118b, or at step 600b, which may include one or more of a registration step 114a, a registration step 114b, an assignment step 116a, and/or other steps. Step 600b may be followed by response step 118b.

Referring to FIG. 1, de-registration component 120 may be configured to de-register a particular hardware identifier, e.g., by removing the particular hardware identifier from the set of registered client computing platforms. In some implementations, de-registration component 120 may be configured to move a previously assigned license. For example, a license may be moved from one client computing platform to another client computing platform. In some implementations, de-registration component 120 may be configured to re-assign a previously assigned license to another combination of client computing platform (or hardware identifier) and/or cryptographic key (or machine identifier). For example, a re-assignment may be accomplished by modifying at least one of the set of registered client computing platforms, the set of registered cryptographic keys, the set of assigned licenses, and/or the set of revoked licenses.

Figure 3:
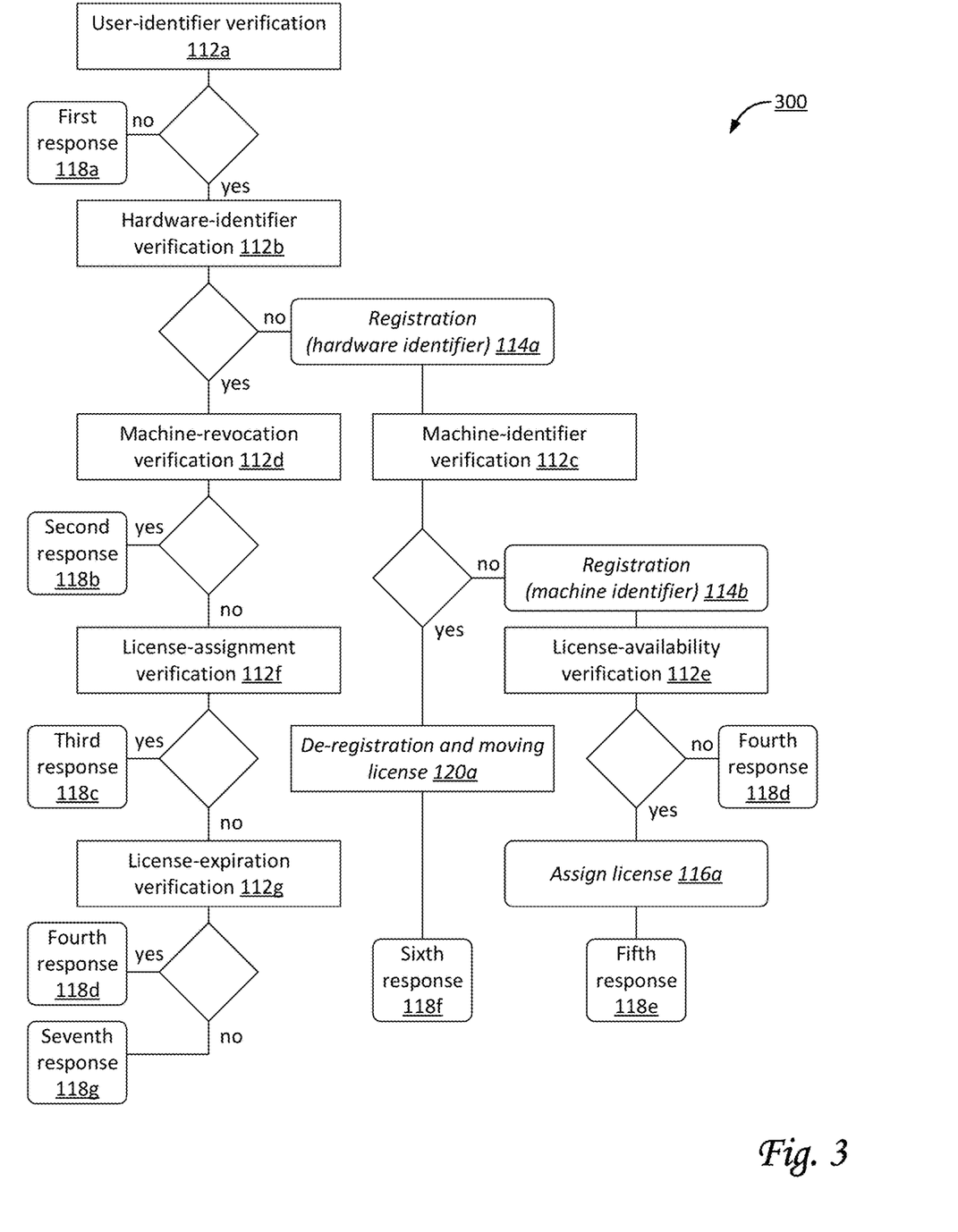
FIGS. 3-4-5-6 illustrates exemplary flow charts as may be used in a system configured for providing authentication and authorization for software license management of a particular software-controlled application, in accordance with one or more implementations.

By way of non-limiting example, FIG. 3 illustrates an exemplary flow chart 300 as may be used in system 100 (in particular, by authentication and authorization platform 105). Flow chart 300 may start at user-identifier verification 112*a*, and further include some or all of the following other types of verification, which may be linked together as depicted in FIG. 3: hardware-identifier verification 112*b*, machine-identifier verification 112*c*, machine-revocation verification 112*d*, license-availability verification 112*e*, license-assignment verification 112*f*, and license-expiration verification 112*g*. Based on the results of these different types of verifications, flow chart 300 may perform some or all of the following actions: registration 114*a*, registration 114*b*, assignment 116*a*, and de-registration and moving license 120*a*. Based on the results of these different types of verifications, flow chart 300 may perform some or all of the following responses: first response 118*a*, second response 118*b*, third response 118*c*, fourth response 118*d*, fifth response 118*e*, sixth response 118*f*, and seventh response 118*g*.

Figure 4:
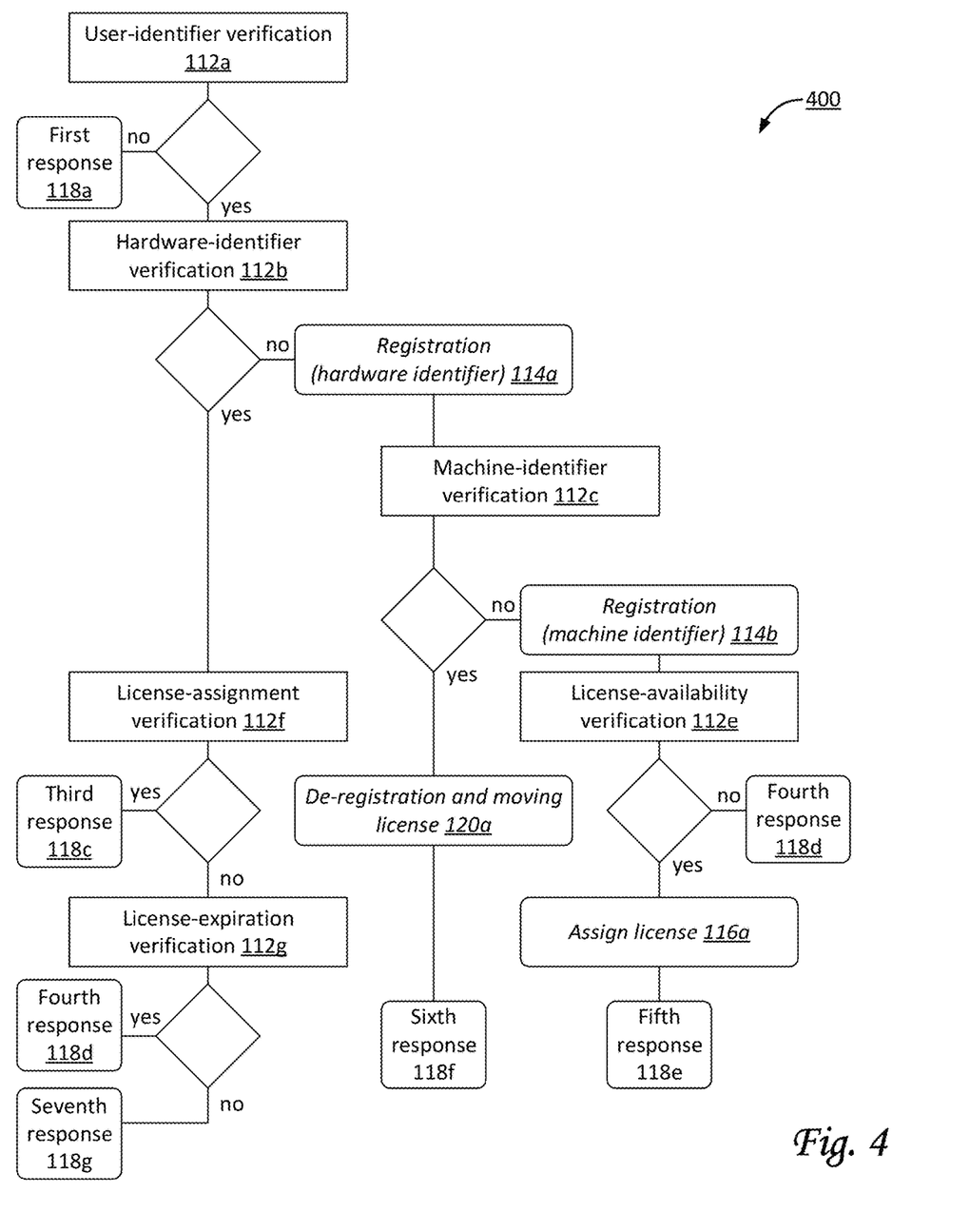

By way of non-limiting example, FIG. 4 illustrates an exemplary flow chart 400 as may be used in system 100 (in particular, by authentication and authorization platform 105). Flow chart 400 may start at user-identifier verification 112*a*, and further include some or all of the following other types of verification, which may be linked together as depicted in FIG. 4: hardware-identifier verification 112*b*, machine-identifier verification 112*c*, license-availability verification 112*e*, license-assignment verification 112*f*, and license-expiration verification 112*g*. Based on the results of these different types of verifications, flow chart 400 may perform some or all of the following actions: registration 114*a*, registration 114*b*, assignment 116*a*, and de-registration and moving license 120*a*. Based on the results of these different types of verifications, flow chart 400 may perform some or all of the following responses: first response 118*a*, third response 118*c*, fourth response 118*d*, fifth response 118*e*, sixth response 118*f*, and seventh response 118*g*.

Figure 5:
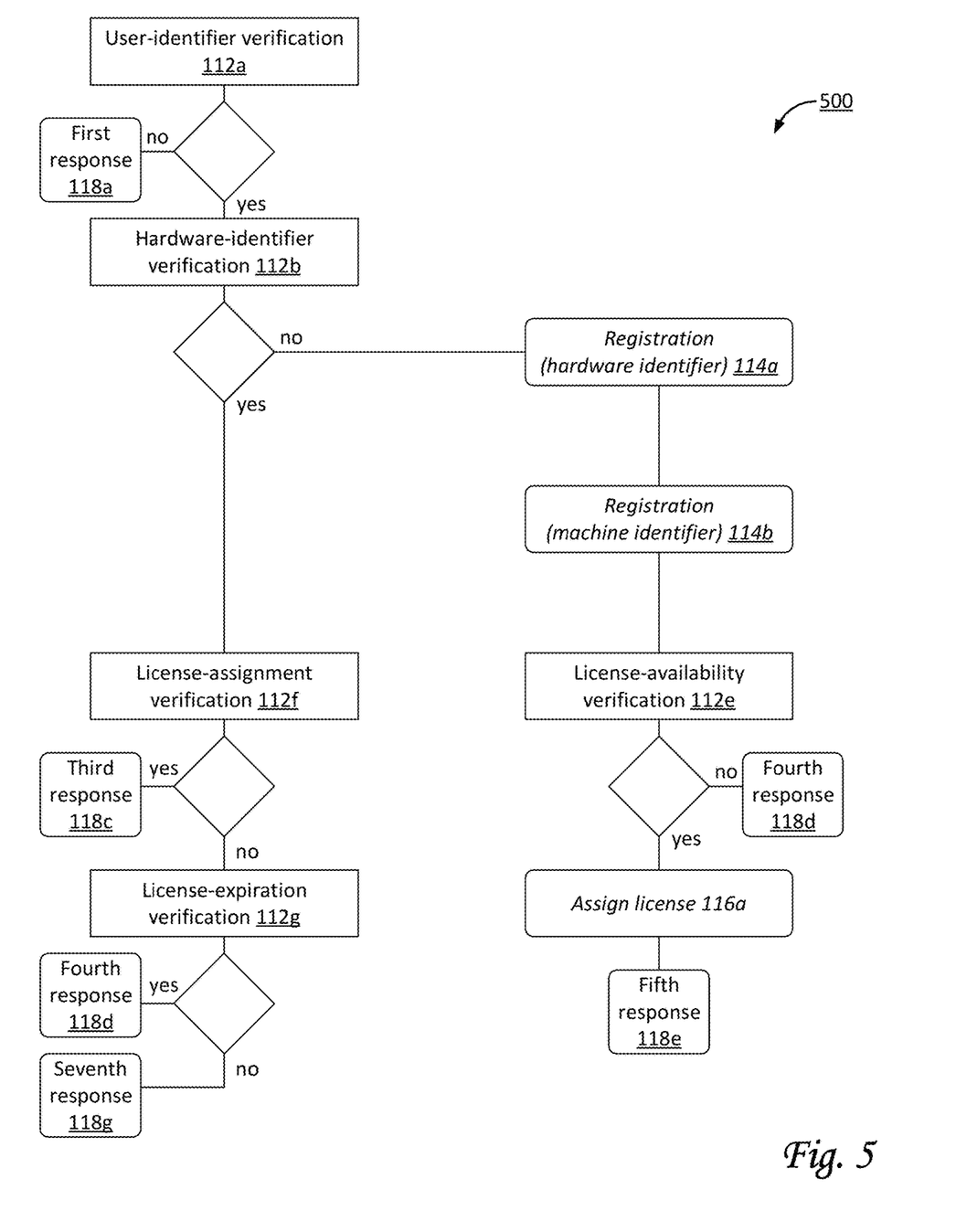

By way of non-limiting example, FIG. 5 illustrates an exemplary flow chart 500 as may be used in system 100 (in particular, by authentication and authorization platform 105). Flow chart 500 may start at user-identifier verification 112*a*, and further include some or all of the following other types of verification, which may be linked together as depicted in FIG. 5: hardware-identifier verification 112*b*, license-availability verification 112*e*, license-assignment verification 112*f*, and license-expiration verification 112*g*. Based on the results of these different types of verifications, flow chart may perform some or all of the following actions: registration 114*a*, registration 114*b*, and assignment 116*a*. Based on the results of these different types of verifications, flow chart 500 may perform some or all of the following responses: first response 118*a*, third response 118*c*, fourth response 118*d*, fifth response 118*e*, and seventh response 118*g*.

Referring to FIG. 1, login component 122 may be configured to receive user input (from users 123) on client computing platforms 104. For example, the user input may represent a particular user request, by a particular user, to access and/or use a particular software-controlled application. Login component 122 may be configured to provide user requests to authentication and authorization platform 105 (and, in particular, to request component 110). Responses from authentication and authorization platform 105 (and, in particular, from response component 118) may be provided to client computing platforms 104 (and, in particular, to login component 122). In some implementations, user input received by login component 122 may include a user identifier, a password, and/or other information. In some implementations, login component 122 may be configured to add certain information to the received user input to form user requests, including but not limited to a hardware identifier, a machine identifier, and/or other information.

Referring to FIG. 1, interface component 124 may be configured to generate, effectuate, and/or present user interfaces 125 on client computing platforms 104 to users. For example, interface component 124 may be configured to present a particular user interface 125 on a particular client computing platform 104 to a particular user. For example, particular user interface 125 may include one or more portions or sections. The one or more portions and/or sections may include a first portion, a second portion, a third portion, a fourth portion, and so forth. In some implementations, a portion of a particular user interface 125 may enable a user to enter and/or select information and/or actions, including but not limited to a particular user identifier, a particular password, and a graphical user interface element to transfer a user request to authentication and authorization platform 105. In some implementations, a portion of particular user interface 125 may be used to present a response to the user (e.g., from response component 118).

Access component 126 may be configured to provide access to software-controlled applications. For example, assume that a particular user is using a particular client computing platform to (try to) access a particular software-controlled application. Upon acceptance of a particular user request from the particular user (such that a particular license is assigned or has been assigned to the particular user) access component 126 may enable the particular user to use the particular software-controlled application. In some implementations, the particular software-controlled application may be executed locally, on the particular client computing platform that is associated with and/or being used by the particular user. In some implementations, the particular software-controlled application may be executed on a server (e.g., on authentication and authorization platform 105 or on external resources 138), such that pertinent information regarding the particular software-controlled application is made available and/or otherwise presented on the particular client computing platform that is associated with and/or being used by the particular user.

Figure 7:
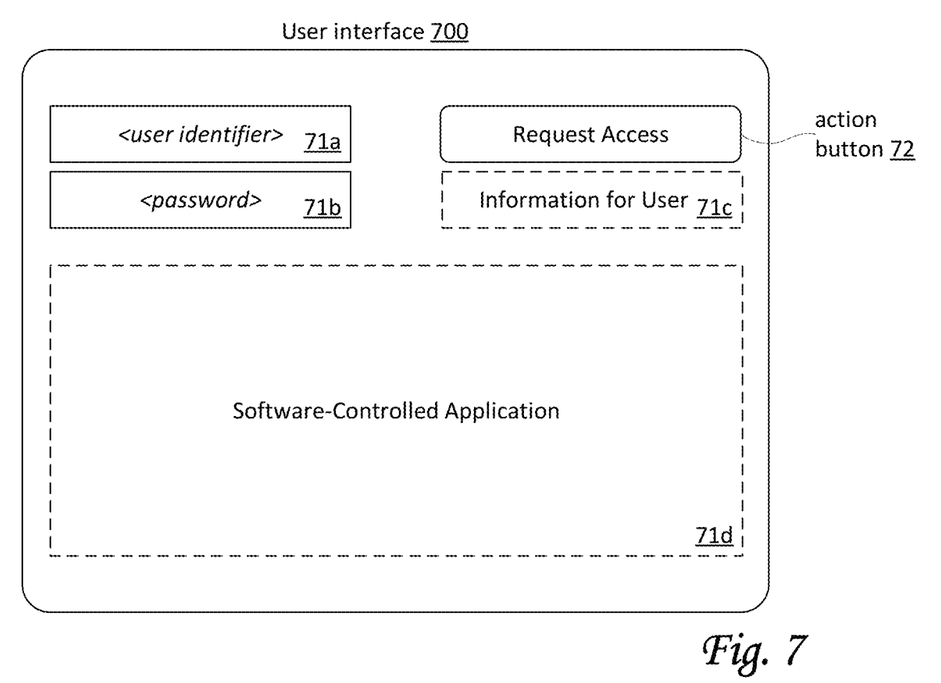
FIG. 7 illustrates an exemplary user interface as may be provided to users of a system configured for providing authentication and authorization for software license management of a particular software-controlled application, in accordance with one or more implementations.

By way of non-limiting example, FIG. 7 illustrates an exemplary user interface 700 as may be present to a user on a client computing platform. User interface 700 may include graphical user interface elements 71*a* and 71*b* that are configured for a user to enter and/or select information. For example, element 71*a* may be used to enter a user identifier and element 71*b* may be used to enter a password. User interface 700 may include an action button 72 labeled "Request Access". Upon selection and/or engagement of action button 72, user interface 700 may initiate and/or otherwise provide a particular user request to authentication and authorization platform 105, based on the entered user identifier and password. User interface 700 may include graphical user interface element 71*c*, labeled "Information for User", which may be used by the system to provide information to the user, including but not limited to feedback, comments, or prompts. For example, a client-side application may interpret responses from authentication and authorization platform 105 (including but not limited to standard HTTP status codes) and provide information to the user, through graphical user interface element 71*c*, that is based on the responses from authentication and authorization platform 105. User interface 700 may include graphical user interface element 71*d*, labeled "Software-Controlled Application", which may be used by the system to provide access to the particular software-controlled application as requested by the user (e.g., a particular enterprise software application, peer-to-peer software application, etc.).

In some implementations, authentication and authorization platform(s) 105, server(s) 102, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which components may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 125 may be configured to facilitate interaction between users and system 100 and/or between users and client computing platforms 104. For example, user interfaces 125 may provide an interface through which users may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

External resources 138 may include sources of information outside of system 100, external entities participating with system 100, and/or other resources. In some implementations, external resources 138 may include a provider of information which may be used by system 100. In some implementations, external resources 138 may include a provider of particular software-controlled applications which may be made available to users through system 100. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within a single processing unit, in implementations in which processor(s) 132 includes multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

Figure 2:
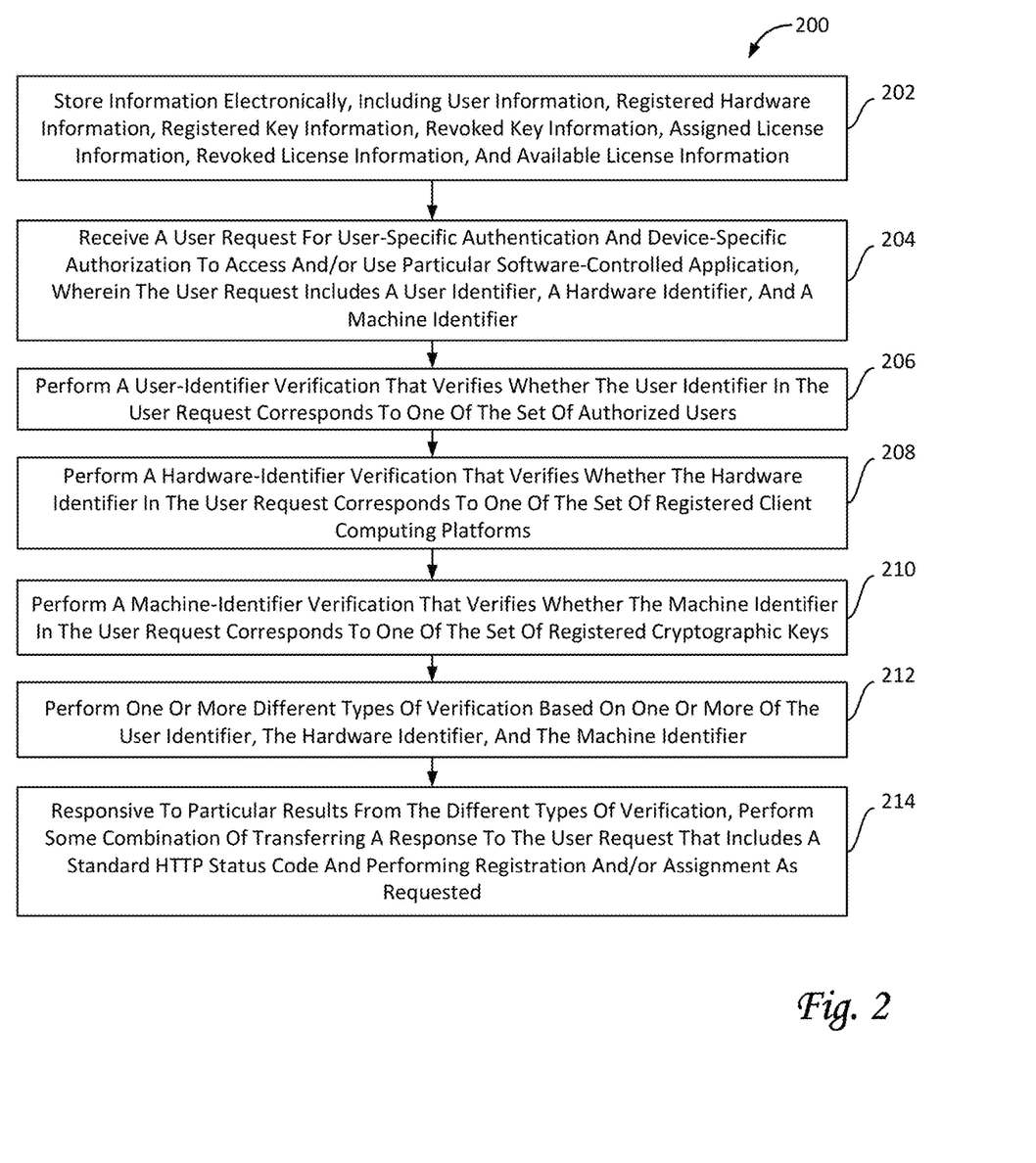
FIG. 2 illustrates a method for providing authentication and authorization for software license management of a particular software-controlled application, in accordance with one or more implementations.

FIG. 2 illustrates a method 200 for providing authentication and authorization for software license management of a particular software-controlled application, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored electronically. The stored information includes user information that identifies a set of authorized users that are authorized to access and/or use the particular software-controlled application, registered hardware information that identifies a set of registered client computing platforms that have been registered to access and/or use the particular software-controlled application, registered key information that identifies a set of registered cryptographic keys that have been registered to access and/or use the particular software-controlled application, revoked key information that identifies a set of revoked cryptographic keys that are no longer registered to access and/or use the particular software-controlled application, assigned license information that identifies a set of assigned licenses that have been assigned to specific users and specific client computing platforms. Individual ones of the set of licenses are associated with individual expiration dates, revoked license information that identifies a set of revoked licenses that are no longer assigned for access and/or use the particular software-controlled application, and available license information that identifies a set of available licenses that are available to be assigned to a specific user and a specific client computing platform. In some embodiments, operation 202 is performed by one or both of electronic storage and a storage component the same as or similar to electronic storage 130 and storage component 108 (shown in FIG. 1 and described herein).

At an operation 204, a user request is received from a user associated with a client computing platform, for user-specific authentication and device-specific authorization to access and/or use the particular software-controlled application. The user request includes a user identifier that identifies the user, a hardware identifier that identifies the client computing platform, and a machine identifier that identifies a cryptographic key. In some embodiments, operation 204 is performed by a request component the same as or similar to request component 110 (shown in FIG. 1 and described herein).

At an operation 206, a user-identifier verification is performed that verifies whether the user identifier in the user request corresponds to one of the set of authorized users. In some embodiments, operation 206 is performed by a verification component the same as or similar to verification component 112 (shown in FIG. 1 and described herein).

At an operation 208, a hardware-identifier verification is performed that verifies whether the hardware identifier in the user request corresponds to one of the set of registered client computing platforms. In some embodiments, operation 208 is performed by a verification component the same as or similar to verification component 112 (shown in FIG. 1 and described herein).

At an operation 210, a machine-identifier verification is performed that verifies whether the machine identifier in the user request corresponds to one of the set of registered cryptographic keys. In some embodiments, operation 210 is performed by a verification component the same as or similar to verification component 112 (shown in FIG. 1 and described herein).

At an operation 212, one or more different types of verification are performed based on at least one of the user identifier, the hardware identifier, and the machine identifier in the user request. In some embodiments, operation 212 is performed by a verification component the same as or similar to verification component 112 (shown in FIG. 1 and described herein).

At an operation 214, responsive to particular results from the different types of verification, some combination is performed of transferring a response to the user request that includes a standard HTTP status code and performing registration and/or assignment as requested. In some embodiments, operation 214 is performed by one or more of a registration component, an assignment component, a response component, and a de-registration component the same as or similar to registration component 114, assignment component 116, response component 118, and de-registration component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system comprising:
   memory configured to store information electronically, wherein the stored information includes:
   (i) user information that identifies a set of authorized users that are authorized to access and/or use a particular software-controlled application,
   (ii) registered hardware information that identifies a set of registered client computing platforms that have been registered to access and/or use the particular software-controlled application, wherein the set of registered client computing platforms are identified using Media Access Control (MAC) addresses, (iii) registered key information that identifies a set of registered cryptographic keys that have been registered to access and/or use the particular software-controlled application, (iv) revoked key information that identifies a set of revoked cryptographic keys that are no longer registered to access and/or use the particular software controlled application, (v) assigned license information that identifies a set of assigned licenses that have been assigned to specific users and specific client computing platforms, wherein individual ones of the set of licenses have been assigned to individual combinations of a particular user and a particular client computing platform, wherein the individual ones of the set of licenses are associated with individual expiration dates, (vi) revoked license information that identifies a set of revoked licenses that are no longer assigned for access and/or use the particular software-controlled application, and (vii) available license information that identifies a set of available licenses that are available to be assigned to a combination of a specific user and a specific client computing platform;

one or more hardware processors configured by machine-readable instructions to:

receive, from a user associated with a client computing device, a user request for user-specific authentication and device-specific authorization to access and/or use the particular software-controlled application, wherein the user request includes:

(a) a user identifier that identifies the user, (b) a hardware identifier that identifies the client computing device, wherein the hardware identifier is a MAC address; and (c) a machine identifier that identifies a cryptographic key;

perform a user identifier verification that verifies whether the user identifier in the user request corresponds to one of the set of authorized users;

perform a hardware identifier verification that verifies whether the hardware identifier in the user request corresponds to one of the set of registered client computing platforms;

perform a machine identifier verification that verifies whether the machine identifier in the user request corresponds to one of the set of registered cryptographic keys;

perform a machine revocation verification that verifies whether the machine identifier in the user request corresponds to one of the set of revoked cryptographic keys;

perform a license assignment verification that verifies whether a particular license corresponds to one of the set of assigned licenses, wherein the particular license is associated with both the hardware identifier and machine identifier;

perform a license expiration verification that verifies whether the particular license has expired;

perform a license availability verification that verifies whether the set of available licenses includes an individual available license, wherein the individual available license is unassigned, unrevoked, and is available to be assigned to the user;

responsive to the user identifier verification failing to verify that the user identifier in the user request corresponds to one of the set of authorized users, transfer a first response to the user request, wherein the first response includes a first standard HyperText Transfer Protocol (HTTP) status code that indicates the user request cannot be fulfilled due to error;

responsive to the hardware identifier verification failing to verify that the hardware identifier in the user request corresponds to one of the set of registered client computing platforms, register the hardware identifier;

responsive to the machine identifier verification failing to verify that the machine identifier in the user request corresponds to one of the set of registered cryptographic keys, register the machine identifier;

responsive to the machine revocation verification verifying that the machine identifier in the user request corresponds to one of the set of revoked cryptographic keys, transfer a second response to the user request, wherein the second response includes a second standard HTTP status code that indicates the user request cannot be fulfilled due to error;

responsive to the license assignment verification verifying that the particular license corresponds to one of the set of assigned licenses, and responsive to the user identifier verification verifying the user identifier in the user request corresponds to one of the set of authorized users, and further responsive to the hardware identifier verification verifying the hardware identifier in the user request corresponds to one of the set of registered client computing platforms, transfer a third response to the user request, wherein the third response includes a third standard HTTP status code that indicates the user request to access and/or use the particular software-controlled application has been successful without newly assigning a new license, wherein the third standard HTTP status code is "200";

responsive to the license expiration verification verifying that the particular license has expired, transfer a fourth response to the user request, wherein the fourth response includes a fourth standard HTTP status code that indicates the user request cannot be fulfilled due to error;

responsive to the license availability verification verifying that the set of available licenses includes the individual available license, assign the individual available license to a combination of the user and to the hardware identifier in the user request such that the set of assigned licenses includes the individual available license, and transfer a fifth response to the user request, wherein the fifth response includes a fifth standard HTTP status code that indicates the user request has been successful and further indicating the individual available license has been assigned, wherein the fifth standard HTTP status code is "201";

responsive to the machine identifier verification verifying that the machine identifier in the user request corresponds to one of the set of registered cryptographic keys, transfer a sixth response to the user request, wherein the sixth response includes a sixth standard HTTP status code that indicates the user request has been accepted; and responsive to the license expiration verification verifying that the particular license has not expired, transfer a seventh response to the user request, wherein the seventh response includes a seventh standard HTTP status code that indicates the user request cannot be fulfilled due to error wherein the first standard HTTP status code, the second standard HTTP status code, the third standard HTTP status code, the fourth standard HTTP status code, and the fifth standard HTTP status code are different from each other.

2. The system of claim 1, wherein the cryptographic key is a public key used for Public Key Infrastructure (PKI).

3. The system of claim 1, wherein individual ones of the set of revoked cryptographic keys correspond to previously-registered client computing platforms that have been reported stolen or missing.

4. The system of claim 1, wherein the machine revocation verification is performed responsive to the hardware identifier verification verifying that the hardware identifier in the user request corresponds to one of the set of registered client computing platforms.

5. The system of claim 1, wherein the license assignment verification is performed responsive to the machine-revocation verification verifying that the machine identifier in the user request does not correspond to one of the set of revoked cryptographic keys.

6. The system of claim 1, wherein the license expiration verification is performed responsive to the license assignment verification verifying that the particular license does not correspond to one of the set of assigned licenses.

7. The system of claim 1, wherein the license availability verification is performed responsive to:
(i) the hardware identifier verification verifying that the hardware identifier in the user request does not correspond to one of the set of registered client computing platforms, and
(ii) the machine identifier verification verifying that the machine identifier in the user request does not correspond to one of the set of registered cryptographic keys.

8. The system of claim 1, wherein responsive to the machine identifier verification verifying that the machine identifier in the user request corresponds to one of the set of registered cryptographic keys, the one or more hardware processors are further configured to:
remove a particular hardware identifier from the set of registered client computing platforms, wherein the particular hardware identifier is associated with the machine identifier in the user request; and
re-assign a given license to the hardware identifier in the user request, wherein the given license was, prior to re-assignment, associated with another hardware identifier.

9. The system of claim 1, wherein the first standard HTTP status code is "401", wherein the second standard HTTP status code is "410", wherein the third standard HTTP status code is "200", wherein the fourth standard HTTP status code is "402", wherein the fifth standard HTTP status code is "201", wherein the system further includes the client computing device associated with the user, wherein the client computing device includes one or more processors configured to:
provide the user request for user-specific authentication and device-specific authorization to access and/or use the particular software-controlled application to the system; and
receive at least one of the first, second, third, fourth, fifth, sixth, or seventh response.

10. A method for providing authentication and authorization for software license management of a particular software-controlled application, the method comprising:
storing information electronically, wherein the stored information includes:
(i) user information that identifies a set of authorized users that are authorized to access and/or use the particular software-controlled application,
(ii) registered hardware information that identifies a set of registered client computing platforms that have been registered to access and/or use the particular software-controlled application, wherein the set of registered client computing platforms are identified using Media Access Control (MAC) addresses,
(iii) registered key information that identifies a set of registered cryptographic keys that have been registered to access and/or use the particular software-controlled application,
(iv) revoked key information that identifies a set of revoked cryptographic keys that are no longer registered to access and/or use the particular software-controlled application,
(v) assigned license information that identifies a set of assigned licenses that have been assigned to specific users and specific client computing platforms, wherein individual ones of the set of licenses have been assigned to individual combinations of a particular user and a particular client computing platform, wherein the individual ones of the set of licenses are associated with individual expiration dates,
(vi) revoked license information that identifies a set of revoked licenses that are no longer assigned for access and/or use the particular software-controlled application,
(vii) available license information that identifies a set of available licenses that are available to be assigned to a combination of a specific user and a specific client computing platform,
receiving, from a user associated with a client computing device platform, a user request for user-specific authentication and device-specific authorization to access and/or use the particular software-controlled application, wherein the user request includes:
(a) a user identifier that identifies the user,
(b) a hardware identifier that identifies the client computing device platform, wherein the hardware identifier is a MAC address, and
(c) a machine identifier that identifies a cryptographic key;
performing a user-identifier verification that verifies whether the user identifier in the user request corresponds to one of the set of authorized users;
performing a hardware identifier verification that verifies whether the hardware identifier in the user request corresponds to one of the set of registered client computing platforms;
performing a machine identifier verification that verifies whether the machine identifier in the user request corresponds to one of the set of registered cryptographic keys;
performing a machine revocation verification that verifies whether the machine identifier in the user request corresponds to one of the set of revoked cryptographic keys;
performing a license assignment verification that verifies whether a particular license corresponds to one of the set of assigned licenses, wherein the particular license is associated with both the hardware identifier and machine identifier;

performing a license expiration verification that verifies whether the particular license has expired;

performing a license availability verification that verifies whether the set of available licenses includes an individual available license, wherein the individual available license is unassigned, unrevoked, and is available to be assigned to the user;

responsive to the user identifier verification failing to verify that the user identifier in the user request corresponds to one of the set of authorized users, transferring a first response to the user request, wherein the first response includes a first standard HyperText Transfer Protocol (HTTP) status code that indicates the user request cannot be fulfilled due to error;

responsive to the hardware identifier verification failing to verify that the hardware identifier in the user request corresponds to one of the set of registered client computing platforms, registering the hardware identifier:

responsive to the machine identifier verification failing to verify that the machine identifier in the user request corresponds to one of the set of registered cryptographic keys, registering the machine identifier;

responsive to the machine revocation verification verifying that the machine identifier in the user request corresponds to one of the set of revoked cryptographic keys, transferring a second response to the user request, wherein the second response includes a second standard HTTP status code that indicates the user request cannot be fulfilled due to error;

responsive to the license assignment verification verifying that the particular license corresponds to one of the set of assigned licenses, and responsive to the user identifier verification verifying the user identifier in the user request corresponds to one of the set of authorized users, and further responsive to the hardware identifier verification verifying the hardware identifier in the user request corresponds to one of the set of registered client computing platforms, transferring a third response to the user request, wherein the third response includes a third standard HTTP status code that indicates the user request to access and/or use the particular software-controlled application has been successful without newly assigning a new license, wherein the third standard HTTP status code is "200";

responsive to the license expiration verification verifying that the particular license has expired, transferring a fourth response to the user request, wherein the fourth response includes a fourth standard HTTP status code that indicates the user request cannot be fulfilled due to error;

responsive to the license availability verification verifying that the set of available licenses includes the individual available license, assigning the individual available license to the user and to the hardware identifier in the user request such that the set of assigned licenses includes the individual available license, and transfer a fifth response to the user request, wherein the fifth response includes a fifth standard HTTP status code that indicates the user request has been accepted;

responsive to the machine identifier verification verifying that the machine identifier in the user request corresponds to one of the set of registered cryptographic keys, transferring a sixth response to the user request, wherein the sixth response includes a sixth standard HTTP status code that indicates the user request has been successful and further indicating the individual available license has been assigned, wherein the fifth standard HTTP status code is "201"; and responsive to the license expiration verification verifying that the particular license has not expired, transferring a seventh response to the user request, wherein the seventh response includes a seventh standard HTTP status code that indicates the user request cannot be fulfilled due to error, wherein the first standard HTTP status code, the second standard HTTP status code, the third standard HTTP status code, the fourth standard HTTP status code, and the fifth standard HTTP status code are different from each other, wherein the third standard HTTP status code is "200" and the fifth standard HTTP status code is "201".

11. The method of claim 10, wherein the cryptographic key is a public key used for Public Key Infrastructure (PKI).

12. The method of claim 10, wherein individual ones of the set of revoked cryptographic keys correspond to previously-registered client computing platforms that have been reported stolen or missing.

13. The method of claim 10, wherein the machine revocation verification is performed responsive to the hardware identifier verification verifying that the hardware identifier in the user request corresponds to one of the set of registered client computing platforms.

14. The method of claim 10, wherein the license assignment verification is performed responsive to the machine-revocation verification verifying that the machine identifier in the user request does not correspond to one of the set of revoked cryptographic keys.

15. The method of claim 10, wherein the license expiration verification is performed responsive to the license assignment verification verifying that the particular license does not correspond to one of the set of assigned licenses.

16. The method of claim 10, wherein the license availability verification is performed responsive to:

(i) the hardware identifier verification verifying that the hardware identifier in the user request does not correspond to one of the set of registered client computing platforms, and (ii) the machine identifier verification verifying that the machine identifier in the user request does not correspond to one of the set of registered cryptographic keys.

17. The method of claim 10, wherein responsive to the machine identifier verification verifying that the machine identifier in the user request corresponds to one of the set of registered cryptographic keys, the method further comprises:

removing a particular hardware identifier from the set of registered client computing platforms, wherein the particular hardware identifier is associated with the machine identifier in the user request; and re-assigning a given license to the hardware identifier in the user request, wherein the given license was, prior to re-assignment, associated with another hardware identifier.

18. The method of claim 10, wherein the first standard HTTP status code is "401", wherein the second standard HTTP status code is "410", wherein the third standard HTTP status code is "200", wherein the fourth standard HTTP status code is "402", wherein the fifth standard HTTP status code is "201", wherein the method further comprises:
  providing, by the client computing device associated with the user, the user request for user-specific authentication and device-specific authorization to access and/or use the particular software-controlled application; and
  receiving at least one of the first, second, third, fourth, fifth, sixth, or seventh response.

* * * * *